United States Patent
Maziers (10) Patent No.: US 9,815,228 B2
(45) Date of Patent: *Nov. 14, 2017

(54) ROTOMOULDED ARTICLES PREPARED FROM A BLEND OF POLYETHYLENE POWDERS

(75) Inventor: Eric Maziers, Seneffe (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 2576 days.

This patent is subject to a terminal disclaimer.

(21) Appl. No.: 11/922,126

(22) PCT Filed: Jun. 21, 2006

(86) PCT No.: PCT/EP2006/063386
§ 371 (c)(1),
(2), (4) Date: Nov. 10, 2009

(87) PCT Pub. No.: WO2006/136572
PCT Pub. Date: Dec. 28, 2006

(65) Prior Publication Data
US 2010/0047596 A1    Feb. 25, 2010

(30) Foreign Application Priority Data
Jun. 22, 2005   (EP) .................................... 05105533

(51) Int. Cl.
*B32B 27/32* (2006.01)
*B29C 41/00* (2006.01)
*B29C 31/06* (2006.01)
*B29C 41/04* (2006.01)
*B29C 41/22* (2006.01)

(52) U.S. Cl.
CPC ............ *B29C 41/003* (2013.01); *B29C 31/06* (2013.01); *B29C 41/04* (2013.01); *B29C 41/22* (2013.01); *Y10T 428/31757* (2015.04); *Y10T 428/31938* (2015.04)

(58) Field of Classification Search
USPC ...................... 428/349, 517, 34.2, 34.3, 34.7
See application file for complete search history.

(56) References Cited

U.S. PATENT DOCUMENTS

| | | |
|---|---|---|
| 3,784,668 A | 1/1974 | Neidinger |
| 4,032,600 A | 6/1977 | MacAdams et al. |
| 4,185,067 A | 1/1980 | MacAdams et al. |

(Continued)

FOREIGN PATENT DOCUMENTS

| | | |
|---|---|---|
| EP | 1 422 059 A1 | 5/2004 |
| JP | 5-123617 | 5/1993 |

(Continued)

OTHER PUBLICATIONS

International Search Report for International Application No. PCT/EP2006/063386, dated Aug. 21, 2006 (4 pages).

(Continued)

*Primary Examiner* — Ellen S Wood
(74) *Attorney, Agent, or Firm* — Albert Shung (57) ABSTRACT

The present invention discloses the use of a dry blend comprising a polyethylene resin and a functionalized polyolefin or ionomer in a composition with a thermoplastic resin in order to produce a layer that provides adhesion, fire resistance and low permeation rate in a multi layer rotomolded article.

11 Claims, 5 Drawing Sheets

(56) References Cited

U.S. PATENT DOCUMENTS

| | | | |
|---|---|---|---|
| 4,419,408 A | | 12/1983 | Schmukler et al. |
| 4,460,632 A | | 7/1984 | Adur et al. |
| 5,366,675 A | | 11/1994 | Needham |
| 5,367,025 A | | 11/1994 | Needham |
| 2002/0077401 A1 | | 6/2002 | Chaudhary et al. |
| 2002/0183448 A1 | * | 12/2002 | Tibbitt et al. ............... 525/88 |
| 2002/0197499 A1 | * | 12/2002 | Hirose et al. ............. 428/517 |
| 2006/0251835 A1 | * | 11/2006 | Maziers et al. ............ 428/35.7 |
| 2007/0254174 A1 | * | 11/2007 | O'Brien et al. ............ 428/500 |
| 2009/0223955 A1 | * | 9/2009 | Maziers ............... B29C 41/04 |
| | | | 220/62.11 |

FOREIGN PATENT DOCUMENTS

| | | |
|---|---|---|
| WO | 93/00400 | 1/1993 |
| WO | 96/15892 | 5/1996 |
| WO | 0032657 A1 | 6/2000 |
| WO | 2005005534 A1 | 1/2005 |
| WO | 2006120188 A1 | 11/2006 |

OTHER PUBLICATIONS espacenet.com patent abstract for Japanese Publication No. 5123617, Publication date May 21, 1993 (1 page).

English translation of Office Action issued in Chinese Patent Application No. 200680021744.5, dated Mar. 22, 2012 (5 pages).

English translation of Office Action issued in Indian Patent Application No. 4115/KOLNP/2007, dated May 17, 2012 (1 page).

D. Annechini, E. Takacs and J. Vlachopoulos, "Some New Results on Rotational Molding of Metallocene Polyethylenes", ANTEC, vol. 1, 2001.

Ticona, "Development for New Polyacetal Grades for Applications in Fuel Contact, Tank tech Conference", Furtenfeldbruck, Munich; Nov. 2005; 42 pages.

Pierre Dalet, "Contribution a la correlation entre architectures macromoleculaires, energies libres de surface et adhesivite", presented in 1999 at Universite de Bordeaux-1 and written in collaboration with Prof. J- J. Villenave.

* cited by examiner

ROTOMOULDED ARTICLES PREPARED FROM A BLEND OF POLYETHYLENE POWDERS

The present invention discloses multilayer rotomoulded articles, wherein one of the layers is prepared from a blend of powders and wherein one of the powders is prepared from a composition of polyethylene and functionalised polyolefin.

Polyethylene represents more than 80% of the polymers used in the rotomoulding market. This is due to the outstanding resistance of polyethylene to thermal degradation during processing, to its easy grinding, good flowability, and low temperature impact properties.

Rotomoulding is used for the manufacture of simple to complex, hollow plastic products. It can be used to mould a variety of materials such as polyethylene, polypropylene, polycarbonate, polyamide, or polyvinyl chloride (PVC). Linear low density polyethylene is preferably used as disclosed for example in "Some new results on rotational molding of metallocene polyethylenes" by D. Annechini, E. Takacs and J. Vlachopoulos in ANTEC, vol. 1, 2001.

Polyethylenes prepared with a Ziegler-Natta catalyst are generally used in rotomoulding, but metallocene-produced polyethylenes are desirable, because their narrow molecular distribution allows better impact properties and shorter cycle time in processing.

The metallocene-produced polyethylenes of the prior art (see ANTEC, vol. 1, 2001) suffer from high shrinkage and warpage and for some applications from their whiteness in their natural state.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerization of these polymer alloys requires a complex catalyst system comprising organometallic catalyst precursors, cationic forming cocatalysts and cross-over agents.

It is thus desired to produce articles prepared with two or more layers of similar or dissimilar material in order to improve the final properties of the finished product. For example, it may be desirable to combine the good shock absorber and impact properties of polyether ester with the acceptable food contact and qualities of polyethylene, such as for example low cost and good impact at low temperature.

It is an aim of the present invention to prepare rotomoulded articles having good adherence between layers of dissimilar material.

It is another aim of the present invention to prepare rotomoulded articles having good fire resistance.

It is a further aim of the present invention to prepare rotomoulded articles having no or very few air bubbles between layers of dissimilar material.

It is yet another aim of the present invention to prepare rotomoulded articles that can be painted.

Accordingly, the present invention discloses a multilayer rotomoulded article that comprises:

A) a first layer prepared from a blend of powders or micropellets comprising:
   a) from 40 to 100 wt % based on the weight of layer A) of a first powder or micropellets composition comprising from 50 to 99.9 wt % based on the weight of composition a) of a homo- or co-polymer of ethylene and from 0.1 to 50 wt % based on the weight of composition a) of a functionalised polyolefin or an ionomer or a combination thereof; and
   b) from 0 to 60 wt % based on the weight of layer A) of a second resin in powder or micropellets form, prepared from polyolefin (PO) or from non-polyolefin (NPO) resin, said second resin being the same as or different from the first resin wherein resin powder b) is dry blended with composition powder a)

B) a second layer adjacent to the first layer, prepared from a thermoplastic material and wherein the adhesion is provided by the first layer;

C) optional additional layers.

The thickness of each layer can vary between 10 and 90% of the total wall thickness.

In another embodiment according to the present invention, all the components of layers A and B can be dry blended and the blend can be used to prepare single layer rotomoulded articles. These articles are thus prepared from a dry blend of:

a) From 10 to 90 wt % based on the weight of the blend, of a first composition consisting of from 40 to 100 wt % based on the weight of the first composition of a first powder or micropellets composisiton consisting of from 50 to 99.9 wt % based on the weight of the first powder of a homo- or co-polymer of ethylene and of from 0.1 to 50 wt % of a functionalised polyolefin or an ionomer or a combination thereof and of from 0 to 40 wt % based on the weight of the first composition of a second resin in powder or micropellets form prepared from a polyolefin or from a non-polyolefin resin or a mixture thereof, said second resin being the same as or different from the first resin;

b) From 10 to 90 wt % based on the weight of the blend, of a second layer prepared from a thermoplastic resin.

In this invention, powders have an average particle size of from 100 to 1500 microns, preferably of about 300 microns and micropellets have an average size particle of from 200 to 1500 microns, preferably of about 500 microns.

The second resin b) in the powder or micropellets blend of layer A) is preferably a homo- or a co-polymer of ethylene.

The blend of layer A) is obtained by dry-blending all its constituting elements in powder or pellet form.

Preferably, the amount of functionalised polyolefin or ionomer is of from 2 to 20 wt % based on the weight of composition a), more preferably, it is of from 4 to 15 wt %. Preferably, the functionalised polyolefin is a functionalised polyethylene or an ionomer, more preferably, it is an ionomer, and most preferably, it is a blend of grafted polyethylene and ionomer.

Polyethylenes prepared with a Ziegler-Natta or with metallocene catalyst or with late transition metal catalyst systems are typically used in rotomolding applications. Linear low density polyethylene is preferably used as disclosed for example in "Some new results on rotational molding of metallocene polyethylenes" by D. Annechini, E. Takacs and J. Vlachopoulos in ANTEC, vol. 1, 2001.

In layer A), polyethylene (PE) is preferably prepared with a Ziegler-Natta or a metallocene-based catalyst system or a combination thereof.

The preferred polyethylene according to the present invention is a homo- or co-polymer of ethylene produced with a catalyst comprising a metallocene on a silica/aluminoxane support. More preferably, the metallocene component is ethylene-bis-tetrahydroindenyl zirconium dichloride or bis-(n-butyl-cyclopentadienyl) zirconium dichloride or dimethylsilylene-bis(2-methyl-4-phenyl-indenyl) zirconium dichloride. The most preferred metallocene component is ethylene-bis-tetrahydroindenyl zirconium dichloride.

In this description, the term copolymer refers to the polymerisation product of one monomer and one or more comonomers.

The melt index of the polyethylene resin preferably used in the present invention typically falls in the range 0.1 to 50 dg/min, preferably in the range 0.2 to 20 dg/min and most preferably in the range 0.5 to 15 dg/min. The melt flow index MI2 is measured following the method of standard test ASTM D 1283 at a temperature of 190° C. and a load of 2.16 kg.

The homo- and co-polymers of ethylene that can be used in the present invention preferably have a density in the range 0.910 to 0.975 g/ml. More preferably the density is of at least 0.915 g/ml, most preferably of at least 0.920 g/ml. More preferably the density is of at most 0.970 g/ml, most preferably of at most 0.955 g/ml. The density is measured following the method of standard test ASTM D 1505 at 23° C.

The polyethylene of the present invention may also have a bi- or multimodal molecular weight distribution, i.e. they may be a blend of two or more polyolefins with different molecular weight distributions, which can be blended either physically or chemically, i.e. produced sequentially in two or more reactors.

The polydispersity D of the polyethylene suitable for the present invention is in the range 2 to 20, preferably 2 to 15, more preferably less than or equal to 10, and most preferably less than or equal to 6, the latter range being typically associated with the preferred metallocene-prepared polyethylene resins. The polydispersity index D is defined as the ratio Mw/Mn of the weight average molecular weight Mw over the number average molecular weight Mn.

The resins of the present invention may also comprise other additives such as for example antioxidants, acid scavengers, antistatic additives, fillers, slip additives or anti-blocking additives, processing aid.

The functionalised polyolefins are polyolefins grafted with a material that provides polarity and/or reactivity and they therefore depend upon the nature of the adjacent layers. Preferably in the present invention, the polyolefins are grafted with anhydride and preferably, the polyolefin is polyethylene or polypropylene, more preferably, it is polyethylene. Among the preferred functionalised polyolefins, one can cite ethylene/vinyl acetate copolymers (EVA), ethylene/acrylic ester copolymers such as methyl acrylate (EMA) or butyl acrylate (EBA), ethylene/acrylic ester/maleic anhydride (MAH) or glycidyl methacrylate (GMA) terpolymers, maleic anhydride grafted polyethylene, maleic anhydride grafted polypropylene, maleic anhydride grafted EVA or AMA, EVOH. Typical functionalised polyolefins are disclosed for example in EP-A-1104788, or in EP-A-1122060.

Alternatively and preferably, an ionomer can be used. Grafted polyethylene provides excellent adhesion properties whereas ionomers enhance mechanical properties and fire resistance. In a more preferred embodiment according to the present invention, the functionalised polyolefin is a mixture of ionomer and grafted polyethylene.

Composition a) of layer A is prepared by extrusion.

The second resin b) is preferably selected from alpha-olefins, more preferably from polyethylene prepared either with a Ziegler-Natta or with a metallocene catalyst system. Preferably it is a metallocene-produced polyethylene and it is the same as that used in composition a).

The second layer B) is selected in order to provide desired properties such as for example barrier properties or food contact or shock absorption, or impact properties or a broad range of working temperature or good hardness or scratch resistance or paintability.

The second layer B) can be selected from polyetherester or saturated polyester or polycarbonate or polyamide or polyvinylidene fluoride, epoxy primer or fluoropolymers containing functional groups.

Preferably, it is polyamide.

The polyamides that can be used in the present invention are the condensation products:
of one or more amino acids such as aminocaproic acid, 7-aminoheptanoic acid, 11-aminoundecanoic acid and 12-aminododecanoic acid of one or more lactams such as caprolactam, oenantholactam and lauryllactam;
of one or more salts or mixtures of diamines such as hexamethylenediamine, dodecamethylenediamine, meta-xylylenediamine, bis(p-aminocyclohexyl)-methane and trimethylhexamethylenediamine with diacids such as isophthalic acid, terephthalic acid, adipic acid, azelaic acid, suberic acid, sebacic acid and dodecanedicarboxylic acid.

It is also advantageously possible to use copolyamides. Mention may be made of the copolyamides resulting from the condensation of at least two α,ω-aminocarboxylic acids or of two lactams or of one lactam and one α,ω-aminocarboxylic acid. Mention may also be made of the copolyamides resulting from the condensation of at least one α,ω-aminocarboxylic acid (or a lactam), at least one diamine and at least one dicarboxylic acid.

Mixtures of polyamide and polyolefins can also be used as layer B. The polyamide is as disclosed hereabove. The polyolefin can be a functionalised or a non-functionalised polyolefin or can be a mixture of at least one functionalised and/or of at least one non-functionalised polyolefin.

A non-functionalised polyolefin is conventionally a homopolymer or copolymer of α-olefins or of diolefins such as, for example, ethylene, propylene, 1-butene, 1-octene or butadiene.

More generally, amine terminated materials can also be used in layer B and they are preferably selected from diamine polyamide (PAdiNH$_2$). According to their process of manufacture and/or the chain limiter used, the polyamides may have excesses of acid or amine end groups or may even have a proportion of alkyl or other end groups, for example aryl or any other function, deriving from the structure of the limiter chosen. The excess of acid end groups derives from a diacid chain limiter. The excess of amine end groups derives from a diamine chain limiter. A primary amine chain limiter leads to a polyamide chain having an alkyl end and an amine end.

The name diamine polyamide, PAdiNH$_2$, refers to a polyamide which satisfies the following criteria:
it has a certain amount of chains ending on both sides with an amine group (NH$_2$)
the amount of chains ending on both sides with an amine group (NH$_2$) is greater than that of diacid chains (if any)
the concentration of amine groups is greater overall than the concentration of acid groups
a PAdiNH$_2$ is obtained by adding a diamine as chain limiter or, in the case of polyamides based on diamine and on diacid by adding more diamine comonomer than diacid comonomer.

The polyamides that can be used in layer B may also be impact-modified polyamides. Supple modifiers may be made, for example, of functionalised polyolefins, grafted aliphatic polyesters, optionally grafted copolymers containing polyether blocks and polyamide blocks, and copolymers of ethylene and of an alkyl (meth)acrylate and/or of a saturated vinylcarboxylic acid ester. The modifier may also be a polyolefin chain with polyamide grafts or polyamide oligomers thus having affinities with the polyolefins and the polyamides. The supple modifier may also be a block copolymer.

Foamed polyamides may also be used in layer B.

Layer B may further advantageously be prepared from polyurethane or from a composition comprising polyamide and ethylene/vinyl alcohol copolymers (EVOH), and more generally, from a composition comprising polyamide and a barrier layer.

In a more preferred embodiment according to the present invention, the second layer B) is prepared from polyamide. Polyamide is known to provide barrier properties and the addition of a polyamide layer thus provides improved barrier properties to the structure. Depending upon the final application, the polyamide layer can be used as an inside layer to provide for example permeation resistance, or as an outside layer, with for example an inner layer allowing for food contact.

A polyamide (PA) layer also provides temperature stability at elevated temperatures of up to 115° C. For comparison, rotomoulded articles conventionally prepared with polyethylene exhibit temperature stability up to temperatures of at most 60° C.

A PA layer further provides good environmental stress crack resistance (ESCR).

The additional layers, if present, are also selected according to the desired properties of the rotomoulded article.

When a good resistance to oxidation and/or acids is necessary, it is preferred to use polyvinylidene fluoride (PVDF) polymer or other fluoropolymer.

Polypropylene has an excellent stress crack resistance whereas polyethylene has an excellent impact resistance. It may thus be advantageous to prepare two-layer rotomoulded articles having an internal polypropylene layer and an external polyethylene layer or vice versa if such properties are needed.

The thickness of each layer is determined by the size of the final product, by the desired properties and by the cost: it can vary from 0.5 mm up to several cm.

The size of the rotomoulded articles varies from 0.5 L up to 70 m$^3$.

Multiple layers object can be prepared either by manual introduction of material during the moulding cycle or by the use of a drop-box.

Manual addition involves moving the mould from the oven, removing a vent tube or plug that creates an opening in the part and adding more material using a fennel or wand. This operation must be repeated for each additional layer.

A drop-box typically contains a single material layer and it is an insulated container that holds material until it is released at the appropriate time during the cycle. The signal for release of material is usually transmitted as a pressure pulse via the airline through the arm of the machine. The insulation must be kept cool to prevent the material inside the box from melting.

In either method, there are two critical factors:
the temperature at which the subsequent layer is added: it is critical for determining the wall thickness of the previous skin formed and how well the two layers may be bound together;
the time elapsed before addition of the subsequent layer of material: if the mould is at rest for too long, material that has already adhered to the wall may sag.

It is possible to reduce these problems by lowering the melt index of the first layer and/or by reducing the injection temperature of the next layer, and/or by cooling the mould slightly before injection or the next layer.

The cycle time necessary to produce multilayer rotomoulded articles depends upon the number of layers and upon the mass injected for each layer. Typically for a double skin article wherein each skin has a thickness of about 3 mm, the total cycle time is from 60 to 80 minutes.

Surprisingly, it has been observed that the cycle time for preparing a multilayer object by successive injections of the several materials is shorter than the cycle time for preparing a monolayer object of the same total thickness and prepared from any one of the several materials.

More surprisingly, it has been observed that water spray cooling can even further reduce the cycle time for producing a multilayer rotomoulded article without exhibiting the substantial deformation and shrinkage observed when water spray cooling is used for preparing single layer PE rotomoulded articles.

Even more surprisingly, it has been observed that the adherence between layer A) and layer B) is much better than that existing between any of constituents a) or b) of layer A) with layer B).

It has also been surprisingly observed that reducing the percentage of functionalised polyolefin or ionomer in layer A by adding component b) does not modify the adhesion between layer A and layer B, whereas the same reduction obtained by reducing the percentage of functonalised polyolefin or ionomer in component a) considerably reduces the adhesion level.

The present invention also discloses a process for preparing a two-layer rotomoulded article wherein layer A is the outer layer and is a polyethylene composition comprising PE and FPO and wherein layer B is the inner layer and is polyamide or PVDF or fluoropolymer containing functional groups, said process comprising the steps of:
a) providing the polyethylene composition for layer A;
b) increasing the peak internal air temperature (PIAT) to a temperature that is from 15 to 50° C. higher than the melting temperature of the composition of layer A in order to fully melt said layer A;
c) adding the composition for layer B using a drop-box;
d) increasing the PIAT to a temperature that is superior to the melting temperature of the composition of layer B in order to fully melt said layer B;
e) cooling down with water spray or air in order to solidify the resins;
f) retrieving the rotomoulded article.

The present invention is particularly useful for preparing fuel tanks for cars and lorries and motorbikes with a size ranging from 5 L to 600 L and more generally for preparing complex structures.

The rotomoulded articles of the present invention have a very high fire resistance, an excellent processability, a much improved adhesion between layers and they can easily be painted because they have a high surface energy.

In another embodiment according to the present invention, the blend of layer A may be used alone to prepare mono-layer rotomoulded articles.

In yet another embodiment according to the present invention, composition a) of layer A can be used alone to prepare mono-layer rotomoulded articles. The preferred composition comprises an ionomer.

In a further embodiment according to the present invention, either composition a) of layer A or layer A can be used in pipe coating applications. Pipe coating typically includes a sequence comprising steel pipe/epoxy/adhesive/polyolefin. In the present invention, the sequence adhesive/polyolefin can advantageously replaced by layer A or by composition a) of layer A, thereby reducing the number of layers.

In yet a further embodiment according to the present invention multilayer rotomoulded articles may be recycled. They are ground and they can either be used as part b) of layer A, or they can be extruded with part a) of layer A in order to constitute a modified layer a).

The processability of the compound comprising recycled material is very good. In addition, the impact properties are surprisingly good even at low temperature with a totally ductile behaviour. The tensile properties are also excellent. The rotomoulded articles comprising recycled material are thus suitable for producing fuel tanks.

The rotomoulded articles of the present invention also resist high temperature cycles (Audi cycle). They satisfy the requirement for high temperature fuel fully described in the publication from Ticona (Munich November 2005: Tank tech Conference, Fürtenfeldbruck). They can be used with all types of high temperature fuels such as for examples alcohol, diesel, biodiesel or gasoline.

EXAMPLES

Several rotomoulded articles were prepared as follows.

All test mouldings were carried out on the ROTOSPEED rotational moulding machine. It is a carrousel-style machine with offset arm, LPG burner arm with a burner capacity of 523 kW/hr, air fan cooling, and/or water spray cooling and a maximum plate diameter of 1.5 m.

An aluminum box mould was used to produce the test mouldings. The mould was equipped with a draft angle to facilitate demoulding and the bi-layer articles were prepared by the use of a drop box. The drop box was filled with the material needed for the first layer and then attached to the lid of the mould. A pneumatic ram in the drop box held the material in place until the required temperature was reached, the ram was then activated and the material was dropped in. That operation was repeated for each layer under the conditions described below.

The tests were carried out on several types of resin compositions. The mould was removed from the oven at different peak internal temperatures. The moulding conditions for the trials were as follows:

oven temperature: 300° C.
rotation ratio: 4:1
cooling medium: water
preheated arm and mould
rotolog unit n°5/rotolog software version 2.7.

Layer A was prepared from various blends according to the present invention wherein the base resin was a metallocene-produced polyethylene (mPE). The metallocene catalyst component was isopropylidene bis(tetrahydroindenyl) zirconium dichloride. For comparison several resins or resin compositions typically used in rotomoulding applications were also used.

The functionalised polyolefin was a functionalised PE or an ionomer.

Layer B was prepared with a polyamide resin.

All the resins or resin compositions are described in Table I.

TABLE I

| Resin | mPE resin | Composition | Form |
|---|---|---|---|
| R1 | M4043UV ®* | 85 wt % mPE + 15 wt % Orevac ®18380# | powder |
| R2 | M3583UV ®* | 85 Wt % Mpe + 15 Wt % Orevac ® 18380# | powder |
| R3 | M4043UV ®* | 95 wt % mPE + 5 wt % Orevac ® C306# | powder |
| R4 | M4043UV ®* | 95 wt % mPE + 5 wt % Priex ® 12031$^a$ | powder |
| R5 | M4043UV ®* | 95 wt % mPE + 5 wt % Priex ® 30101$^a$ | powder |
| R6 | M4043UV ®* | 95 wt % mPE + 2.5 wt % Priex ® 12031$^a$ + 2.5 wt % Priex ® 30101$^a$ | powder |
| R7 | M4043UV ®* | 97 wt % mPE + 3 wt % Priex ® 12031$^a$ | micropellets |

TABLE I-continued

| Resin | mPE resin | Composition | Form |
|---|---|---|---|
| R8 | M4043UV ®* | 50 wt % R7 + 50 wt % R10 | Blend micropellets powder |
| R9 | M4043UV ®* | 50 wt % R6 + 50 wt % R10 | powder |
| R10 | M4043UV ®* | — | powder |
| R11 | PA11 Rilsan ®# | — | |
| R12 | XL4008 ®$ | — | |

*Produced by TOTAL Petrochemicals
Produced by Arkema
$Cross-linked PE resin produced by Matrix Polymers
ᵃproduced by Solvay.

Resin mPE was a linear low density polyethylene (LLDPE) having a melt flow index of 4 dg/min, a melting temperature Tm of 120° C. and a vicat temperature Tv of 83° C.

Fire Resistance.

Single-layer articles were produced respectively with resins R6, R10, R11 and R12 in order to assess the fire resistance. The rotomoulded articles were prepared as follows:

A1 was prepared with resin R6 and had a 4 mm wall thickness;
A2 was prepared with resin R10 and had a 7 mm wall thickness;
A3 was prepared with resin R10 and had a 11 mm wall thickness;
A4 was prepared with resin R11 and had a 6 mm wall thickness;
A5 was prepared with resin R12 and had a 6 mm wall thickness;

The fire resistance was measured following the method of standard test ISO 5660-1. It is a cone calorimeter method using the Fire technology ConeCalc software. The test conditions are:
 surface area of 100 cm$^2$
 heat flux of 60 kW/m$^2$
 horizontal.
The quantities that were measured:
 time to ignition in seconds;
 heat released in kW/m$^2$;
 mass loss rate in g/sec.

Figure 1:
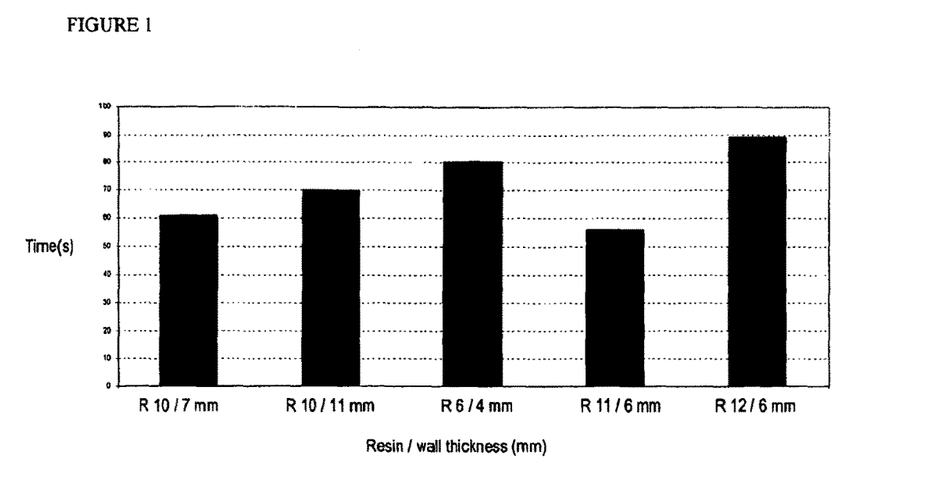
FIG. 1 represents the ignition time expressed in seconds for rotomoulded articles of specified wall thicknesses and resin composition.

The results for ignition time are displayed in FIG. 1. It can be seen that adding ionomers Priex 12031 and 30101 to resin R10 brought a significant improvement in ignition time even for a part which had a smaller wall thickness than that produced with resin R10 (4 mm versus 7 and 11 mm respectively).

Rotomoulded fuel tanks are typically used in boat applications that must fulfil ISO standard 10088. Prior art resin R10 needs a wall thickness of 11 mm to pass the test whereas cross-linked resin R12 needs a wall thickness of 8 to 9 mm. It was surprisingly observed that the blend R6, used in the present invention, that was prepared from resin R10 and a blend of ionomers, was very close to the fire performance of cross-linked resin R12.

Processability.

A two-layer article was produced with resin R9 according to the present invention as outside layer and R11 as inside layer in order to assess the processability. For comparison, another two-layer article was prepared with resin R4 as outside layer and R11 as inside layer.

Figure 2:
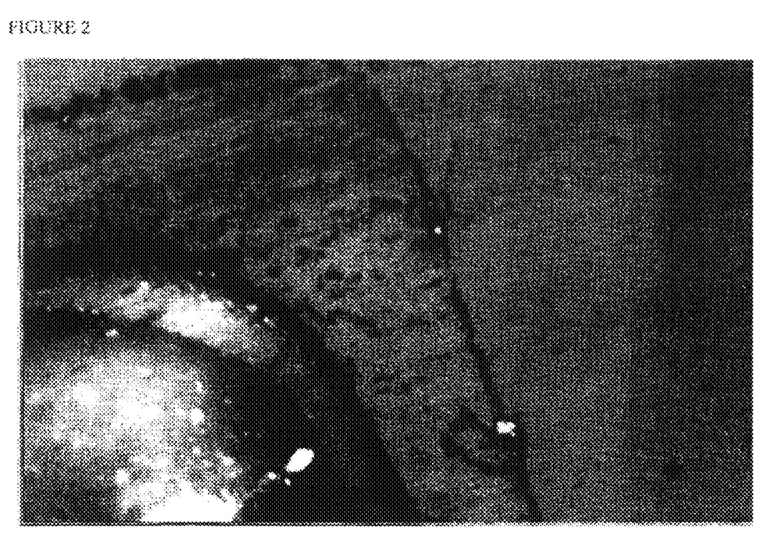
FIG. 2 represents a two-layer rotomoulded article wherein the inside layer is prepared from polyamide resin R11 and the outside layer is prepared from resin R9 that is a powder blend according to the present invention. The interface between both layers is perfect.
Figure 3:
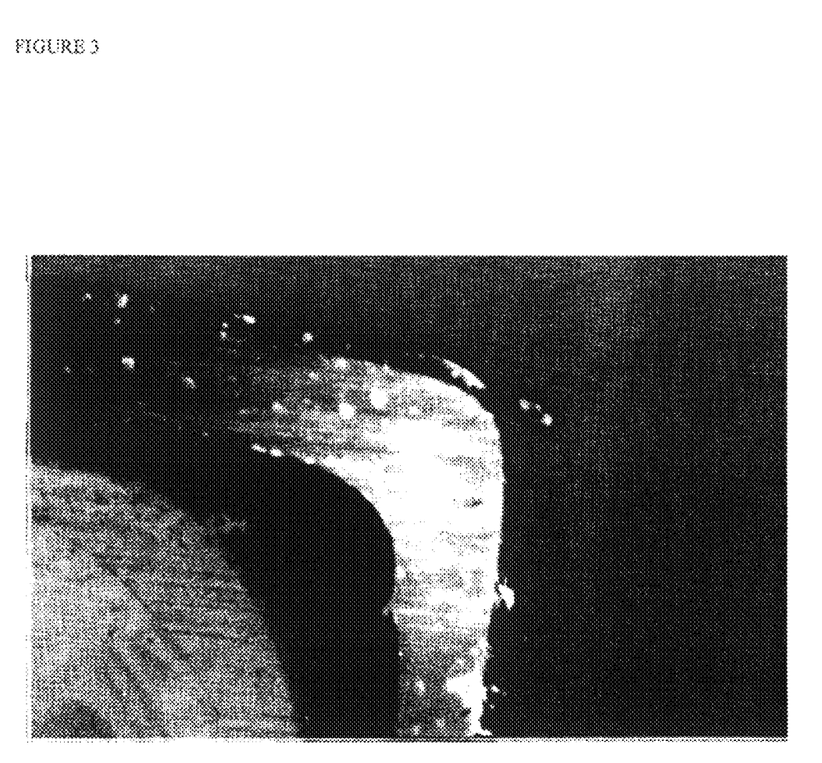
FIG. 3 represents a two-layer rotomoulded articles wherein the inside layer is prepared from polyamide resin R11 and the outside layer is prepared from resin R4 that is a conventional blend of metallocene-prepared polyethylene with a functional polyolefin. Air bubbles are trapped between the two layers especially in sharp angles.

The results are presented in FIGS. 2 and 3 for the articles prepared respectively with resins R9/R11 and with resins R4/R11.

It was observed that the resins according to the present invention showed a neat interface between the two layers whereas the prior art article had several air bubbles trapped between the two layers especially in the sharp angles.

Delamination.

Rotomoulded articles were prepared with R11 as inside layer and one of R1 to R9 as outside layer.

Figure 4:
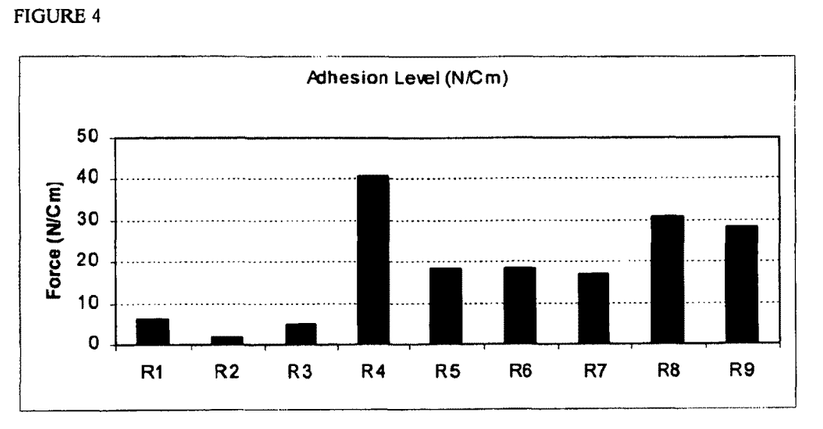
FIG. 4 represents the adhesion level expressed in N/cm for two-layer rotomoulded articles wherein the inside layer is prepared from polyamide resin R11 and the outside layer is a blend as indicated on the figure.

The linear force in delamination mode was tested with the dynamometer 400/M, Captor 100N testing system. The testing speed was of 50 mm/min, the temperature of 23° C.+ or −2° C. and the force per length was determined in N/cm. The results are displayed in FIG. 4. It was further observed that for the bi-layer structure R8/R11, adhesion between the PE and PA layers was so strong that delamination occurred within the PE layer and not at the interface between the two layers.

Surprisingly, the adhesion level of blends R8 and R9 according to the present invention was higher than that of the starting resins R6 and R7 to which was added a plain polyethylene resin R10 that had no adhesion properties. One would have expected on the contrary, a degradation of the adhesion level of resin R6 or R7 by addition of resin R10.

Additional adhesion tests were carried out on two-layer rotomoulded fuel tanks wherein the external layer had a thickness of 4 mm and was prepared with resin R5 either alone or dry blended in a 50/50 composition with metallocene-prepared polyethylene R10. The internal layer had a thickness of 2 mm and was prepared with polyamide PA11. The rotomoulded parts were cooled with water.

Samples were cut from rotomoulded parts and were immersed in fuel C and in fuel C10 at a temperature of 40° C. Peeling tests were carried out after 1, 2, 3, and 6 months of fuel contact. The results are displayed in Table II.

TABLE II

| Resin | 0 days | 1 month | 2 months | 3 months | 6 months |
|---|---|---|---|---|---|
| | Contact with fuel C | | | | |
| R5 | 19 | 19 | 21 | 18 | 19 |
| R5 + R10 | 19 | 19 | 17 | 18 | 17 |
| | Contact with fuel C10 | | | | |
| R5 + R10 | 19 | | | | 18 |

These results revealed that the adhesion level was not affected by prolonged contact with fuel, the variations observed being within the limit of accuracy of the method. The same results were observed for structures prepared with the polyamide layer outside and the polyethylene-based layer inside. The adhesion properties were thus preserved making these rotomoulded articles quite suitable for fuel tank applications.

Surface Energy.

In some instances, it is desirable to paint the rotomoulded part. The paintability is function of the surface energy level that must have a value of at least 39 mJ/m$^2$ in order retain non-polar adhesive systems.

The surface energy was evaluated by a method based on the equilibrium existing between a drop of liquid deposited on a solid surface in the presence of the liquid vapour. The surface energy can be expressed as $$\gamma sv = \gamma sL + \gamma L \cdot \cos \theta$$

wherein γsv is the surface energy of the solid in the presence of the liquid vapour, γsL is the interfacial energy between solid and liquid, γL is the liquid surface tension and θ is the contact angle of the liquid on the solid. The method is fully described in Dalet (Thèse de Pierre Dalet: intitulée <<Contribution à la corrélation entre architectures macromoléculaires, énergies libres de surface et adhésivité.>> presented in 1999 at Université de Bordeaux-1 and written in collaboration with Prof. J-J. Villenave).

Figure 5:
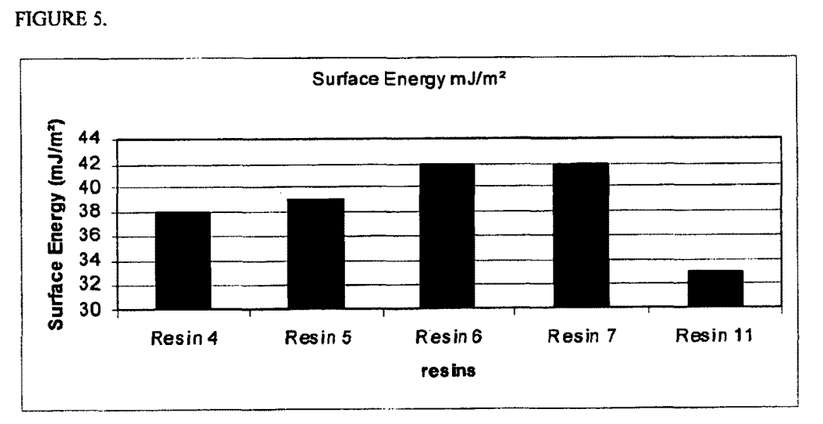
FIG. 5 represents the surface energy expressed in mJ/m$^2$ for several resins or resin compositions as indicated on the figure.

The results for surface energy are presented in FIG. 5. It can be seen that resins R6 and R7 have a surface energy well above the paintability threshold.

Impact Properties.

Figure 6:
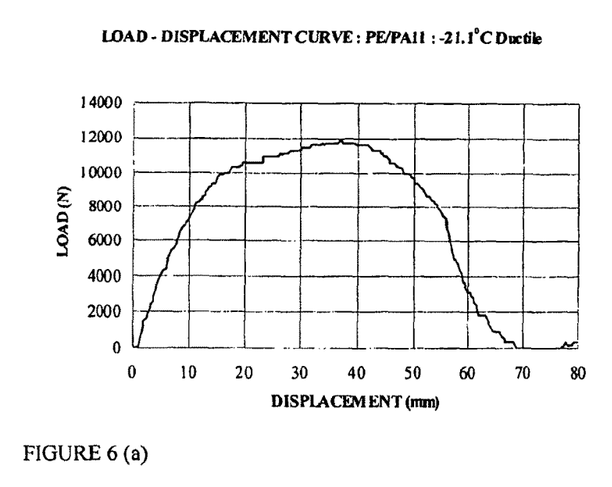
FIG. 6(a) represents the energy curve for a two-layer rotomoulded article according to the present invention wherein the horizontal axis is the displacement expressed in mm and the vertical axis is the load expressed in newtons
FIG. 6(b) represents the energy curve for a rotomoulded article prepared from cross-linked polyethylene wherein the horizontal axis is the displacement expressed in mm and the vertical axis is the load expressed in newtons.

Two-layer rotomoulded fuel tanks were prepared. The external layer had a thickness of 4 mm and was prepared with resin R5. The internal layer had a thickness of 2 mm and was prepared with polyamide PA11. The impact properties were measured following the method of standard test ISO 6602. The energy curve is displayed in FIG. 6(a) representing the displacement expressed in mm as a function of load expressed in Newtons. They exhibit a completely ductile behaviour quite comparable to that of crossed-linked polyethylene from Paxxon also represented in FIG. 6(b) for comparison.

Permeability.

Permeation tests were carried out at a temperature of 40° C. for fuel C and for fuel C10 using the method of standard test ECE34. In the U.S.A. permeation level for fuel tanks must meet the level required by CARB and EPA of less than 1.5 g/m$^2$/day, at a temperature of 40° C. for fuel C, and at a temperature of 28° C. for fuel C10. For the fuel tanks prepared according to the present invention, that target was reached respectively for a wall thickness of 10 to 11 mm for fuel C and for a wall thickness of 8 mm for fuel C10. 10 L bottles of different wall thickness were prepared from resin R10 alone or from a 50/50 blend of resin R10 and R5: they were filled respectively with fuel C and with fuel C10. The permeation rate results expressed in g/m$^2$/day are displayed in Table III.

TABLE III

| Thickness | R10 | | R5 + R10 | |
|---|---|---|---|---|
| mm | Fuel C | Fuel C10 | Fuel C | Fuel C10 |
| 6 | 6.47 | 7.22 | 7.37 | 5.09 |
| 8 | 5.07 | 4.79 | 4.33 | 2.59 |
| 10 | 3.06 | 2.38 | 2.19 | 1.3 |
| 12 | 1.545 | 2.77 | 0.76 | 0.36 |

The fuel tanks prepared according to the present invention thus have much better barrier properties to fuel than mPE and very good barrier properties to alcohol.

The blend according to the present invention also has the advantage of reducing the cost of layer A as a substantial fraction of the layer may be provided by a low cost resin.

It further offers the flexibility to tailor the blend according to the needs by dry blending the polyethylene composition with another resin selected for example from polyethylene, polypropylene, polyamide, plastomers, polivinylidene fluoride (PVDF) and by modifying the amount of each component to improve either impact or fire resistance or rigidity, or paintability.

The high temperature Audi cycle test was carried out on two layer rotomoulded parts wherein the external layer was prepared from resin R5 and had a wall thickness of 4 mm and the internal layer was prepared from PA11 and had a wall thickness of 2 mm. They passed the test for high temperature alcohol, gasoline, diesel and biodiesel.

Recycled multilayer rotomoulded articles were also tested for impact, tensile properties and permeability. Rotomoulded bilayer fuel tanks prepared from resin R5 and PA11 were ground and re-extruded with 40 wt % based on the total weight of a composition comprising 95 wt % based on the weight of the composition of metallocene prepared polyethylene R10 and 5 wt % of Priex 12301. This compound was ground and used to produce single layer rotomoulded parts.

The processability was excellent.

The impact properties were measured following the method of standard test ISO 6602-3. The tests were carried out at temperatures of 23° C. and of −20° C. on 6 mm thick mouldings.

The results were as follows.
Temperature of 23° C.
Peak energy=25 J
Total energy=48.4 J
Ductility index=48%
Temperature of −20° C.
Peak energy=32.4 J
Total energy=56.9 J
Ductility index=43%

A ductility index larger than 40% is representative of a ductile behaviour. The samples thus had a ductile behaviour even at low temperature.

Tensile tests were carried out on the same samples following the method of standard test ASTM D693. The results were as follows.
Young modulus=591 MPa
Yield stress=18.15 MPa
Yield elongation=11.4%
Rupture elongation=362%

Recycled material can thus be used to produce excellent quality rotomoulded parts such as fuel tanks or tanks.

The invention claimed is:

1. A single layer rotomoulded article prepared from a dry blend of
    a) from 10 to 90 wt % based on the weight of the blend, of a first composition consisting of from 40 to 90 wt % based on the weight of the first composition of a first powder or micropellets composition consisting of from 50 to 99.9 wt % based on the weight of the first powder of a linear low density ethylene co-polymer and of from 0.1 to 50 wt % of a functionalised polyolefin or an ionomer or a combination thereof and of from 10 to 40 wt % based on the weight of the first composition of a second resin in powder or micropellets form prepared from the or the linear low density ethylene co-polymer wherein the second resin is dry blended with the first resin;
    b) from 10 to 90 wt % based on the weight of the blend of a second composition prepared from a thermoplastic resin comprising polyamide.

2. A single layer article comprising a powder or micropellets blend comprising:
    a) from 40 to 90 wt % based on the weight of the blend of a first resin in powder or micropellets composition of from 50 to 99.9 wt % based on the weight of composition a) of a homopolymer of ethylene having a melt index ranging from 0.1 to 50 dg/min and of from 0.1 to 50 wt % based on the weight of composition a) of a functionalised polyolefin or an ionomer or a combination thereof; and
    b) from 10 to 40 wt % based on the weight of the blend of a second resin in powder or micropellets form prepared from the homopolymer of ethylene;
    wherein resin powder b) is dry blended with composition powder a), and wherein about 50 wt % of the blend comprises metallocene-catalyzed polyethylene.

3. The single layer article of claim 2 wherein said article is rotomoulded.

4. The single layer article of claim 2 wherein said article is a pipe coating.

5. A single layer article comprising a composition comprising a resin in powder or micropellets form of from 50 to 99.9 wt % based on the weight of the composition of a homopolymer of ethylene having a melt index ranging from 0.1 to 50 dg/min and of from 0.1 to 50 wt % based on the weight of the composition of an ionomer or a functionalised polyolefin and an ionomer, wherein the resin is dry blended with a second resin in powder or micropellets, and wherein the second resin comprises the homopolymer of ethylene; and wherein about 50 wt % of the composition is metallocene catalyzed polyethylene.

6. The single layer article of claim 5 wherein the composition comprises the ionomer and a grafted polyethylene.

7. The single layer article of claim 5 wherein said article is rotomoulded.

8. The single layer article of claim 5 wherein said article is a pipe coating.

9. The single layer article of claim 2, wherein the homopolymer of ethylene has bimodal or multimodal molecular weight distribution.

10. The single layer article of claim 5, wherein the homopolymer of ethylene has bimodal or multimodal molecular weight distribution.

11. The single layer rotomoulded article of claim 1, wherein about 50% of the weight of the polyethylene in the blend is metallocene-catalyzer polyethylene.

\* \* \* \* \*